United States Patent [19]

Corcoles

[11] Patent Number: 5,663,987
[45] Date of Patent: Sep. 2, 1997

[54] DIGITAL SIGNAL RECEIVER DEVICE COMPRISING FILTERING MEANS

[75] Inventor: Vincent Corcoles, St. Martin d'Heres, France

[73] Assignee: Merlin Gerin, France

[21] Appl. No.: 57,785

[22] Filed: May 6, 1993

[30] Foreign Application Priority Data

May 12, 1992 [FR] France ................. 92 05846

[51] Int. Cl.⁶ .................. H04L 25/06; H04L 25/10
[52] U.S. Cl. .................. 375/317; 375/350; 333/202; 327/34
[58] Field of Search .................. 375/103, 316, 375/317, 350, 355, 340, 343, 346, 219, 287, 286, 285, 243; 455/283; 307/542, 543; 361/100; 333/202; 327/552, 311, 34, 310, 551, 30

[56] References Cited

U.S. PATENT DOCUMENTS

| 3,480,910 | 11/1969 | Brenza et al. |
|---|---|---|
| 3,938,081 | 2/1976 | Kirk .................. 340/146.1 |
| 4,317,111 | 2/1982 | Masoero . |
| 4,358,846 | 11/1982 | Morgan . |
| 4,456,992 | 6/1984 | Schaub . |
| 5,001,374 | 3/1991 | Chang .................. 307/543 X |
| 5,394,473 | 2/1995 | Davidson .................. 381/36 |

FOREIGN PATENT DOCUMENTS 051141  5/1982  European Pat. Off. .

Primary Examiner—Tesfaldet Bocure
Assistant Examiner—Bryan Webster
Attorney, Agent, or Firm—Parkhurst, Wendel & Burr, L.L.P.

[57] ABSTRACT

The signals transmitted on communication lines in a disturbed environment can be affected by strays. A digital filtering device eliminates these strays by suitable detection of the logic states of the digital signals. The signals received are sampled at a frequency greater than the digital information transmission rate, then detection of a state is effective when a minimum number of samples from among a predetermined number of successive samples is reached. The filtering device restores the rising and descending fronts, and also the high and low states without impairing the information. Application to a highly disturbed electromagnetic environment, notably communication links with circuit breakers.

6 Claims, 6 Drawing Sheets

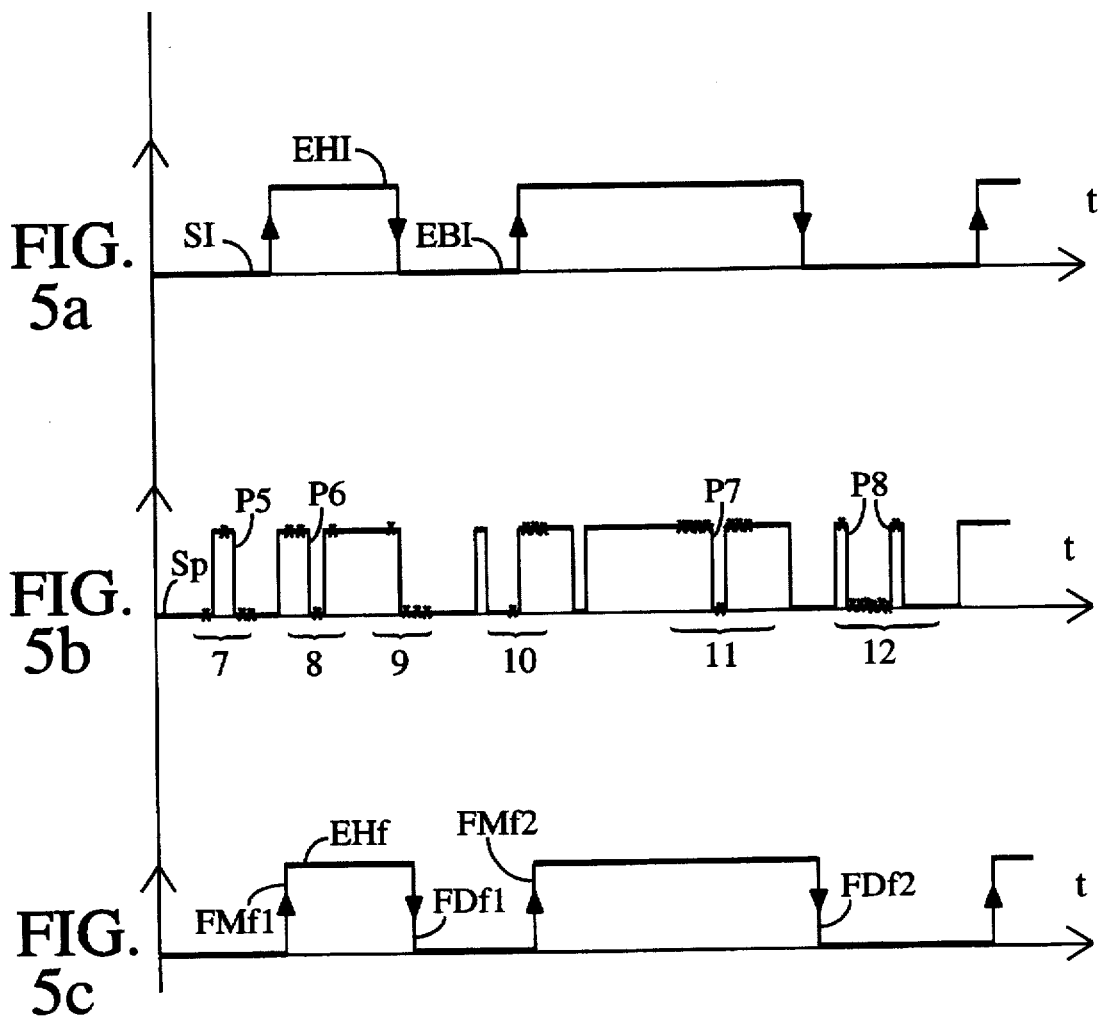

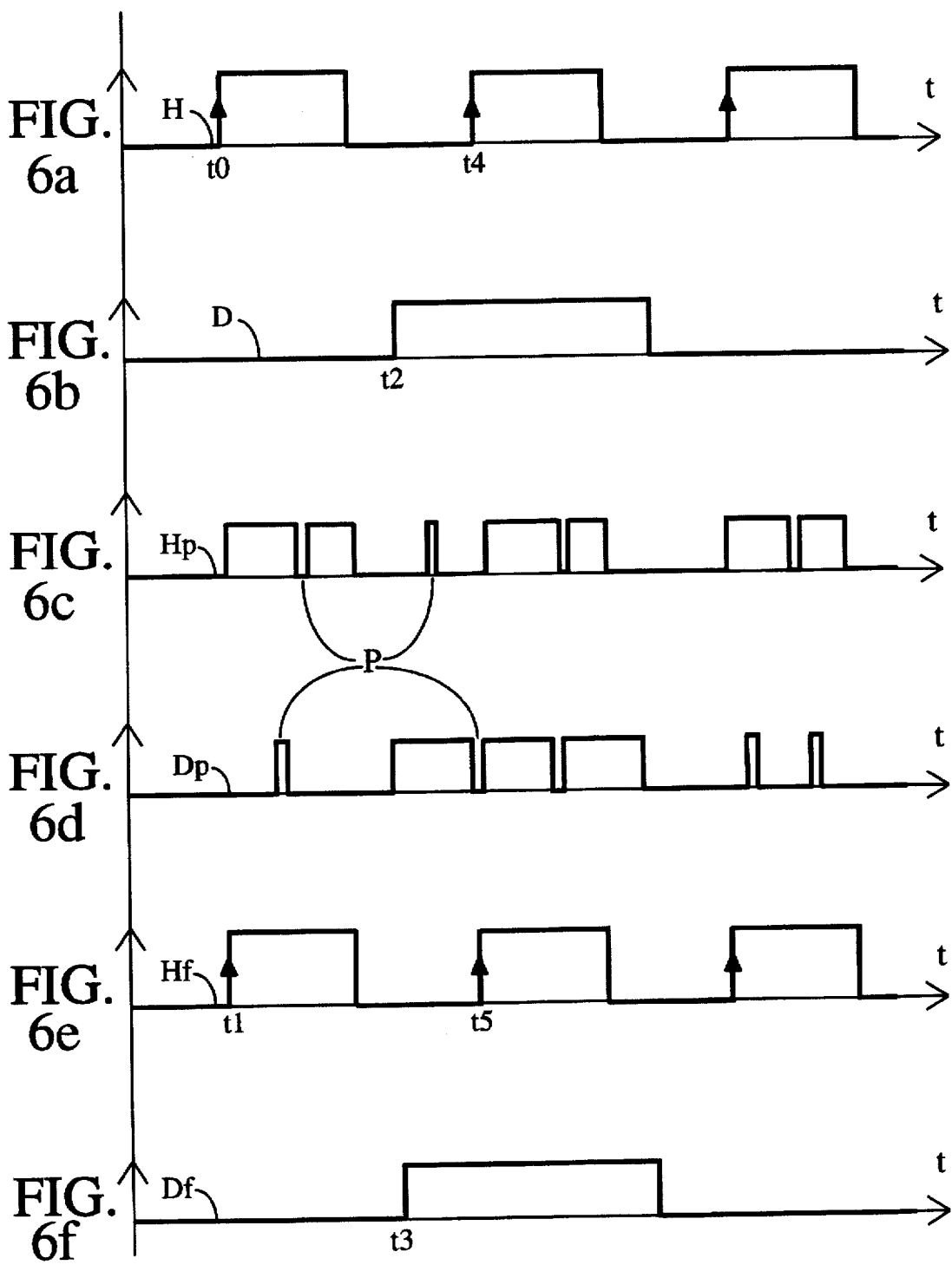

DIGITAL SIGNAL RECEIVER DEVICE COMPRISING FILTERING MEANS

BACKGROUND OF THE INVENTION

The invention relates to a digital signal receiver device comprising input means supplying output signals representative of the logic state of the digital signals applied to the input of the receiver device, a processing circuit and means for filtering strays.

The links between electronic equipment in disturbed industrial environments are often achieved by transmission lines which carry digital information in serial or parallel form. The lines may be in synchronous or asynchronous mode. For protection of these lines, it is state of the art to shield the links by using special cables whose shielding is connected to the general frame ground of the electrical installation or earthed. However, in some cases it happens that high energy signals reach the receiver. Clipping devices eliminating the voltage surges so as to protect the electronic components, and analog filters, achieved with RC or LR cells, enable the undesirable effects of strays to be reduced. These disturbed links are located for example near high-current or high-voltage breaking devices such as circuit breakers or switches.

Transmission lines in industrial environments are greatly affected by electromagnetic disturbances, and the strays which are superposed on the useful signals are very difficult to eliminate completely. Shielding of the connecting cables, protection by clipping of the voltage surges and analog filtering enable the level of electromagnetic susceptibility to be greatly increased. But for very high levels of disturbance, these means are insufficient and the signals bearing the information may present inacceptable defects.

The object of the invention is to achieve a digital filtering device enabling the strays present on the signals bearing the information to be eliminated.

SUMMARY OF THE INVENTION

According to the invention, this object is achieved by the fact that the filtering means comprise means for digital filtering connected between the input means and the processing circuit, the means for digital filtering comprising means for sampling the output signals from the input means and means for analyzing, during an analysis period, a first predetermined number of successive samples, the analyzing means comprising means for determining the number of samples having a first logic state during the analysis period, so as to supply on output a signal or first logic state if the number of samples in this state is greater than a predetermined value.

According to a development of the invention, it comprises a plurality of filtering means having different first numbers and different predetermined values. In this way, it is possible to apply different filtering criteria for the detection of fronts.

Preferably said predetermined value is greater than or equal to half of said first number.

BRIEF DESCRIPTION OF THE DRAWINGS

Other advantages and features will become more clearly apparent from the following description of illustrative embodiments of the invention, given as non-restrictive examples only and represented in the accompanying drawings, in which:

FIG. 5 represents the initial signals, disturbed, then filtered according to an embodiment of the invention.

FIG. 6 represents the transmission signals, operating in synchronous mode, and filtered according to an embodiment of the invention.

DETAILED DESCRIPTION OF THE PREFERRED EMBODIMENT

Figure 1:
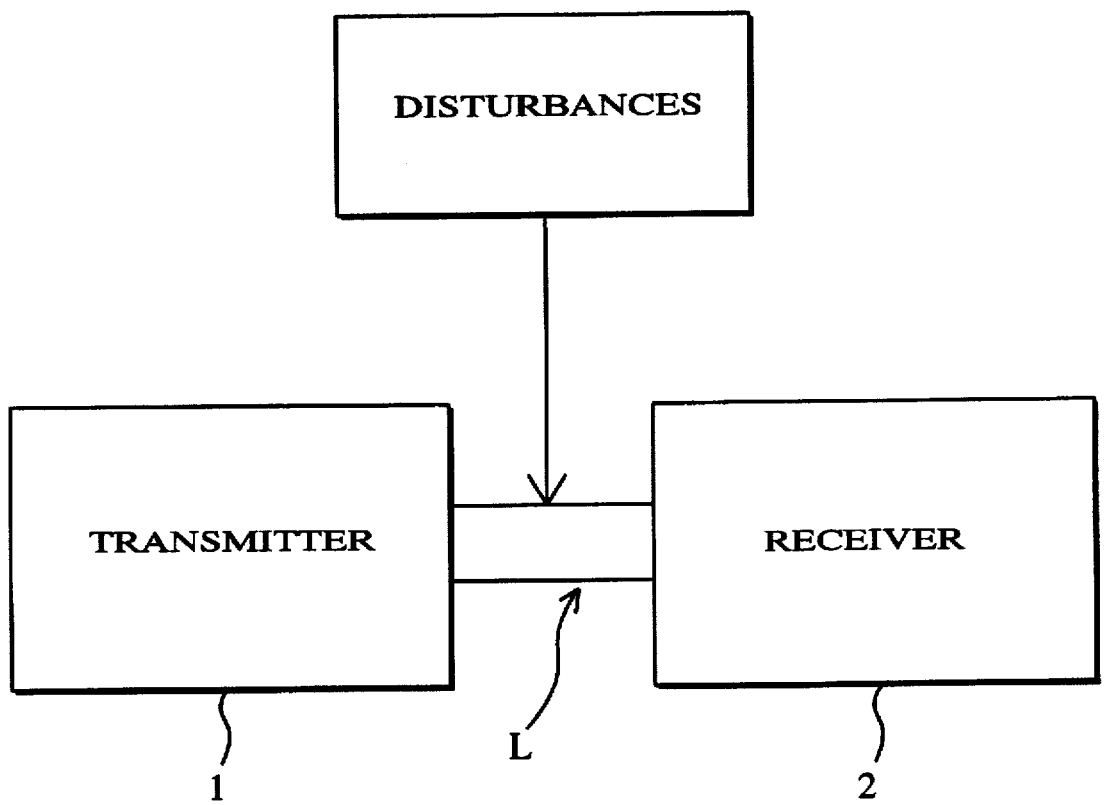
FIG. 1 represents the block diagram of a communication system.

The block diagram in FIG. 1 represents a communication system between a transmitter 1 and a receiver 2 located in a disturbed industrial environment. The transmitter can be included in a circuit breaker, either inside an associated electronic trip device or in an auxiliary circuit, whereas the receiver can be part of the external auxiliary circuitry distant from the circuit breaker, such as enclosures for signalling, remote control or connection to a mains system. A link L between the transmitter 1 and receiver 2 can therefore be located in an environment where the electromagnetic disturbances 3 are great. These disturbances generally have a very short rise and fall time, which gives them a very high frequency spectrum. In this disturbed environment, the link L receives, by electromagnetic induction or by capacitive coupling, energy in the form of transient, stray currents or voltages, which are added to the signals normally transmitted by the link.

Figure 2:
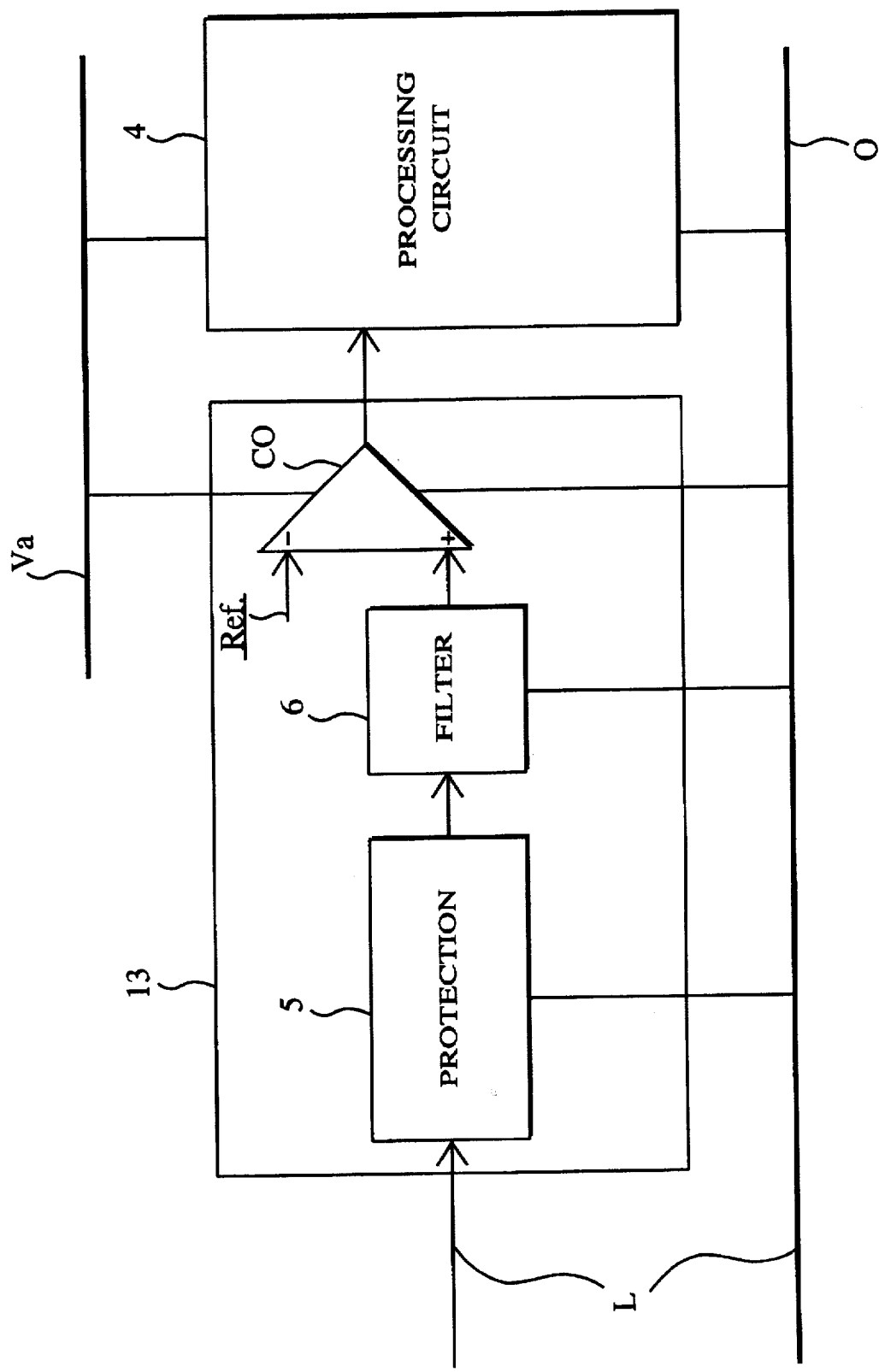
FIG. 2 shows the protection and filtering devices associated with a communication receiver.

In state-of-the-art manner, the input circuitry of a receiver 2, such as the one in FIG. 2, has protection circuits 5 which clip the signals when their voltage exceeds positive or negative limit values. Then, an analog filter 6 eliminates a large part of the strays without disturbing the useful signal. Generally the filter is formed by low-pass type cells comprising resistors and capacitors or induction coils and resistors, but the efficiency of this type of filter is not always sufficient for a high reliability of transmission.

In a simple, state-of-the-art manner, differentiation between a low state and a high state of a signal is performed by a comparison circuit CO. The circuit 5, filter 6 and comparison circuit CO form an input circuit 13 of the receiver 2.

Figure 3A:
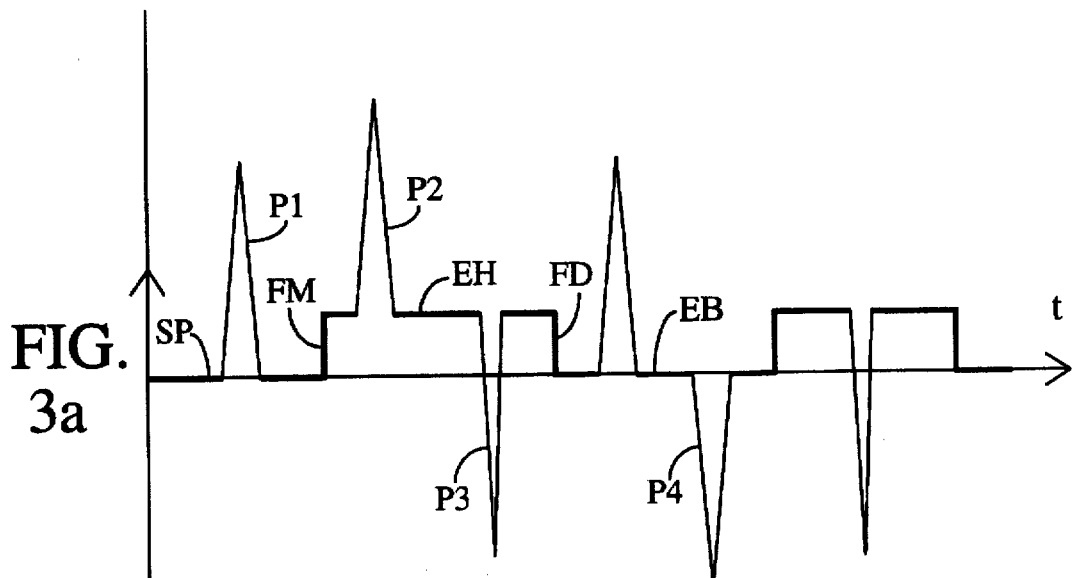
FIG. 3 shows the influence of disturbances on the transmission lines and of strays on signal transition detection.
Figure 3B:
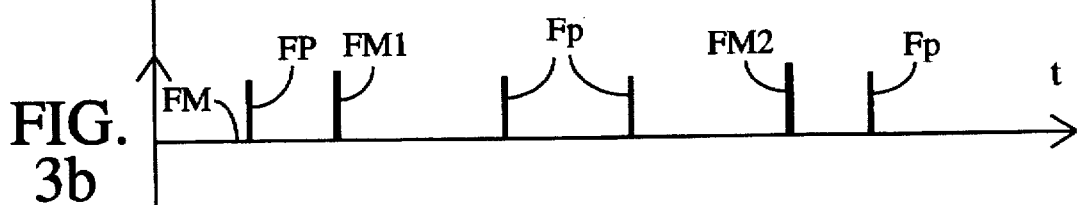
Figure 3C:
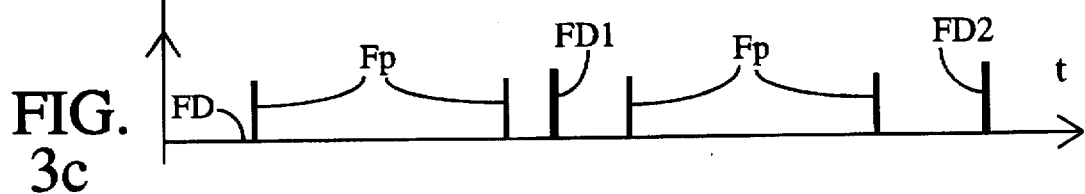

When the signal coming from the filter is lower than a threshold Ref, the signal is considered as being at low state, otherwise it is considered as being at high state. The output signals from the comparison circuit are then directed to a processing circuit 4 designed for communication management. The processing circuit 4 is in state-of-the-art manner built around a microprocessor. The comparison circuit CO and processing circuit 4 can be achieved in a single integrated circuit and have a common power supply Va, O. In the case where the transmitted signals are digital signals, the processing circuit can detect the states of the logic signals, and/or the transition of signals between these states. Detection of transitions, rising fronts or descending fronts, is very sensitive to strays. FIG. 3 shows detection of fronts of a digital signal disturbed by strays. The signal SP (curve 3a) loaded with strays can take high states EH and low states EB between which rising fronts FM and descending fronts FD have to be detected. The sign of the strays being random, it can cause erroneous detection of rising fronts (curve 3b) and/or descending fronts (curve 3c). A positive stray P1 occurring on a low state or a negative stray P3 occurring on a high state generate detection of rising (curve 3b) and descending (curve 3c) fronts Fp. On the other hand, a positive stray P2 on a high state or a negative stray P4 on a low state do not generate detection of fronts. Thus stray fronts Fp are mixed with the real fronts FM1, FM2, FD1 and FD2 (curves 3b and 3c).

Figure 4:
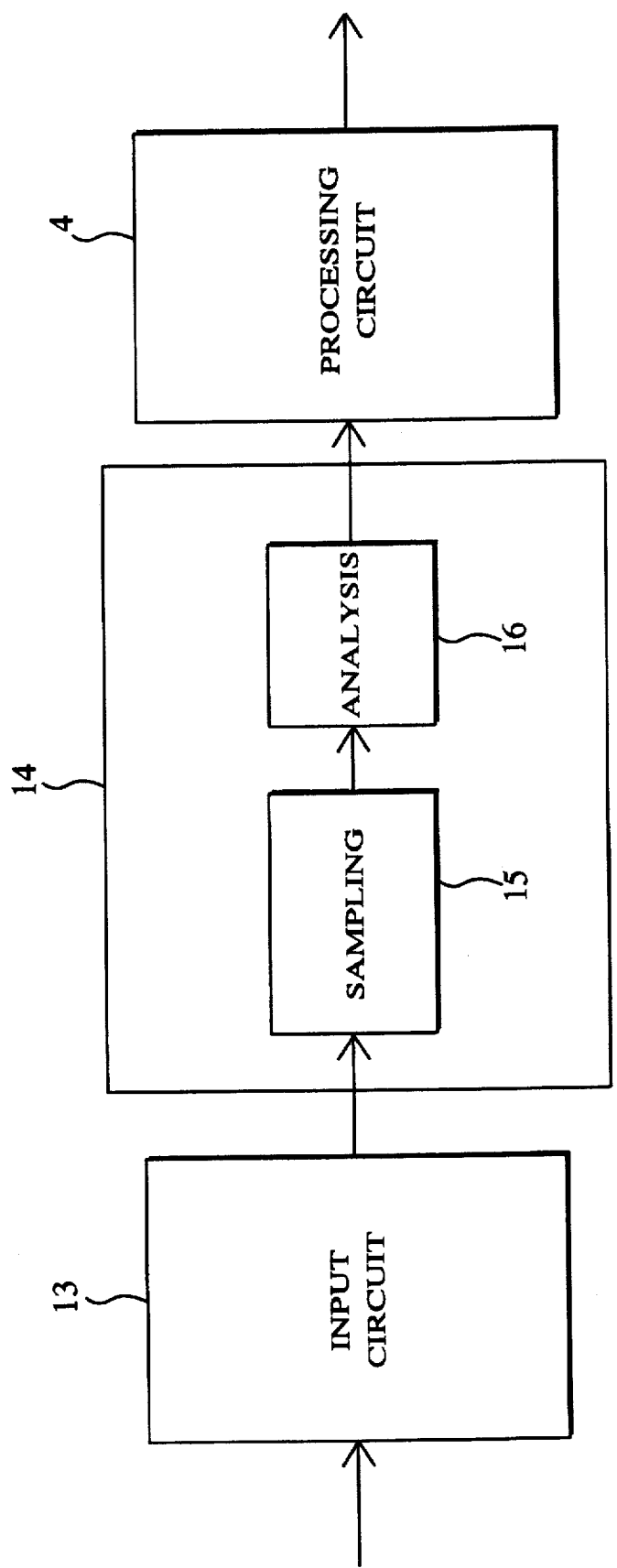
FIG. 4 shows the position of a digital filter according to the invention.

To ensure good rejection of these strays (FIG. 4), a digital filter 14 is connected between the input circuit 13 and processing circuit 4. The digital filter 14 samples, or reads at regular intervals, and stores in a sampling circuit 15, the output signals from the circuit 13, representative of the disturbed state of the signals transmitted on the line L.

The sampling frequency must be greater than the transmission rate of the transmitted information and lower than the inverse of the duration of a stray. These samples are analyzed in an analysis circuit 16 which, after filtering, supplies on output to the processing circuit 4 logic signals representative of the state of the signals transmitted on the line L, after the strays have been eliminated. A logic state is considered to be true, by the circuit 16, when a certain proportion of samples corresponding to this state is reached. This proportion is calculated at each sampling period for an analysis period comprising a predetermined number of successive samples. In a particular embodiment of the invention, detection of a high or low state is validated if at least 4 samples out of 8 successive samples are at high state, or respectively low state. Detection of fronts can be performed on a smaller number of samples. For example, if the processing circuit 4 has to detect fronts, the circuit 16 can use only 4 successive samples to detect a state, the latter being considered to be true if at least 3 samples out of 4 are in this state.

For a signal SI (FIG. 5, curve 5a) presenting a high state EHI and a low state EBI, a disturbed signal can be of the form represented at Sp (curve 5b). During the analysis period 7, three samples out of four are at low state and the filter 14 supplies a low state on output. The stray P5 therefore does not alter the result. Likewise, during the analysis period 8, three samples out of four are at high state and the descending front of the stray P6 is not detected. During the analysis period 9, on the other hand, switching to low state, and during the analysis period 10 switching to high state are detected. In curve 5b, the analysis periods 7 to 10 correspond to four samples, the states thus detected being applied to the input of the processing circuit 4 for detection of fronts. The analysis periods 11 and 12 each comprise eight samples to enable detection of the states by the processing circuit 4. During the analysis period 11, seven samples out of eight are at high state, which eliminates the stray P7. The two strays P8 do not modify detection of the low state in the course of the analysis period 12. The rising fronts FMf1 and FMf2 and descending fronts FDf1 and FDf2 as well as the filtered high state EHf and low state EBf (curve 5c) no longer present any strays.

FIG. 6 shows an application of the invention to a synchronous type serial transmission system. In a transmission system of this kind, two signals are transmitted, viz. a data signal D (curve 6b) and a clock signal H (curve 6a) designed to validate the state of the data on its rising fronts. The clock rising front has to validate a low state at the time t0, whereas at the time t4, it has to validate a high state of the data signal. Disturbed signals of the clock Hp (curve 6c) and data Dp (curve 6d) present strays P which would make erroneous extra data validated in the absence of particular feature. Digital filtering, of the same type as in FIG. 4, applied respectively to each of the signals Hp and Dp, eliminates the strays and supplies the filtered signals Hf (curve 6e) and Df (curve 6f). The signals coming from filtering are delayed with respect to the initial signals. This delay, corresponding to an analysis period, is to be found both on the clock signal (t1–t0 and t5–t4) and on the data signal (t3–t2) which means that the synchronization of the signals is not disturbed.

In a particular embodiment, the functions of the comparison circuit CO, sampling circuit 15, analysis circuit 16 and processing circuit 4 can be performed by means of a common microprocessor.

The digital filter described above is particularly well-suited to links between transmitter and receiver in disturbed environments. It can be applied both to serial links and to parallel links. The embodiments which have been described take account of two logic states (high and low), but the invention can be applied to signals comprising several distinct logic states. For example, for a signal which comprises four logic states represented by four voltage levels, a state can be detected when at least four samples out of eight correspond to this state. Reading of the states or fronts can be performed simultaneously or sequentially, with a variable number of successive samples and a variable minimum number of samples. Preferably, the digital filter can be integrated in the processing circuit microprocessor in charge of transmission line management in the receiver, but it may take other forms, notably a filtering circuit independent from the main receiver microprocessor.

I claim:

1. A digital signal receiver device comprising:
   input means for supplying output signals representative of the logic state of the digital signals applied to the input of the receiver device; a processing circuit; and a digital filtering means, connected between the input means and the processing circuit, for filtering stray signals from the output signals supplied by the input means;
   wherein the digital filtering means includes sampling means for sampling the output signals from the input means to generate a predetermined first number of successive samples within a first analysis period and a predetermined second number of successive samples within a second analysis period, and analyzing means for determining the number of the successive samples within the first analysis period that have a predefined logic state and the number of the successive samples within the second analysis period that have the predefined logic state; and
   wherein the analyzing means supplies an output signal to the processing circuit that is indicative of whether the number of successive samples within the first and second analysis periods that have the predefined logic state respectively exceed first and second predetermined values.

2. A digital signal receiver device comprising:
   input means for supplying output signals representative of the logic state of the digital signals applied to the input of the receiver device;
   a processing circuit; and
   a digital filtering means, connected between the input means and the processing circuit, for filtering stray signals from the output signals supplied by the input means,
   wherein the digital filtering means includes sampling means for sampling the output signals from the input means to generate a predetermined first number of successive samples within a first analysis period and a predetermined second number of successive samples within a second analysis period, and analyzing means for determining the number of the successive samples within the first analysis period that have a predefined logic state and the number of the successive samples within the second analysis period that have the predefined logic state, wherein the analyzing means supplies an output signal to the processing circuit that is indicative of whether the number of successive samples within the first and second analysis periods that have the predefined logic state respectively exceed first and second predetermined values, and wherein the first analysis period is applied to a clock signal to detect one of a rising and falling edge of the clock signal, and wherein the second analysis period is applied to a data signal to detect a state of the data signal.

3. The device of claim 1, wherein the first analysis period detects one of a rising and falling edge of the digital signals applied to the input of the receiver device and the second analysis period detects a state of the digital signals applied to the input of the receiver device.

4. The device according to claim 1, wherein said first predetermined value is greater than or equal to half of said predetermined first number of successive samples.

5. The device according to claim 1, wherein the digital signals can take at least two logic states.

6. The device according to claim 1, wherein the digital filtering means are integrated in the processing circuit.

* * * * *